United States Patent
Pellaud

(10) Patent No.: US 10,597,278 B2
(45) Date of Patent: Mar. 24, 2020

(54) METHOD OF DISPENSING A BEVERAGE WITH VARIABLE PRESSURE

(71) Applicant: Anheuser-Busch InBev S.A., Brussels (BE)

(72) Inventor: Jerome Pellaud, New Rochelle, NY (US)

(73) Assignee: Anheuser-Busch InBev S.A., Brussels (BE)

( * ) Notice: Subject to any disclaimer, the term of this patent is extended or adjusted under 35 U.S.C. 154(b) by 0 days.

(21) Appl. No.: 15/514,484

(22) PCT Filed: Sep. 25, 2015

(86) PCT No.: PCT/EP2015/072145
§ 371 (c)(1),
(2) Date: Mar. 24, 2017

(87) PCT Pub. No.: WO2016/046385
PCT Pub. Date: Mar. 31, 2016

(65) Prior Publication Data
US 2017/0240404 A1    Aug. 24, 2017

(30) Foreign Application Priority Data
Sep. 26, 2014   (EP) .................................. 14186698

(51) Int. Cl.
*B67D 1/00*   (2006.01)
*A47J 31/40*   (2006.01)
(Continued)

(52) U.S. Cl.
CPC .......... *B67D 1/0078* (2013.01); *A47J 31/407* (2013.01); *B67D 1/0021* (2013.01);
(Continued)

(58) Field of Classification Search
CPC ...... B67D 1/0078; B67D 1/0027; B67D 1/07; B67D 1/1275; B67D 1/1281; A47J 31/407; C12C 11/11
(Continued)

(56) References Cited

U.S. PATENT DOCUMENTS

2013/0129885 A1   5/2013   Majer

FOREIGN PATENT DOCUMENTS

| GB | 2374816 | 10/2002 |
|----|---------|---------|
| GB | 2491154 | 11/2012 |

(Continued)

OTHER PUBLICATIONS

JP-2014-078644A—English Abstract—Included in the Japanese patent document. (Year: 2014).*

*Primary Examiner* — Hamid R Badr
(74) *Attorney, Agent, or Firm* — Levy & Grandinetti

(57) ABSTRACT

A method prepares and dispenses a beverage with a dispensing device. The device includes a housing with a beverage unit having a liquid line, a pressure controller to control liquid line pressure, and an ingredient container receiving means. The content of the ingredient container is in fluid communication with a liquid line to mix the ingredient container contents with a base liquid in the liquid line. The device further includes an ingredient container identification unit and a processor coupled for controlling the pressure controller. The method includes providing an ingredient container in the device, identifying the ingredient container, providing a base liquid, and mixing the contents of the ingredient container with the base liquid dispensing the prepared beverage. The pressure in the liquid line changes from a first pressure level to a second pressure level by the pressure controller during mixing and dispensing of the beverage.

3 Claims, 1 Drawing Sheet

(51) Int. Cl.
  *B67D 1/07*     (2006.01)
  *B67D 1/12*     (2006.01)
  *C12C 11/11*    (2019.01)
  *C12G 3/04*     (2019.01)
  *B67D 1/08*     (2006.01)

(52) U.S. Cl.
  CPC .............. *B67D 1/0027* (2013.01); *B67D 1/07* (2013.01); *B67D 1/1275* (2013.01); *B67D 1/1281* (2013.01); *C12C 11/11* (2013.01); *C12G 3/04* (2013.01); *B67D 2001/0811* (2013.01)

(58) Field of Classification Search
  USPC .......................................................... 426/590
  See application file for complete search history.

(56) References Cited

FOREIGN PATENT DOCUMENTS

| | | | | |
|---|---|---|---|---|
| JP | 8-119-388 | * | 6/1996 | ............... B67D 1/04 |
| JP | 2010-173664 | | 8/2010 | |
| JP | 2013-526995 | | 6/2013 | |
| JP | 2014078644 | * | 5/2014 | ........... H01L 21/027 |
| JP | 2014-515283 | | 6/2014 | |
| WO | WO 2011/151703 | | 12/2011 | |

* cited by examiner

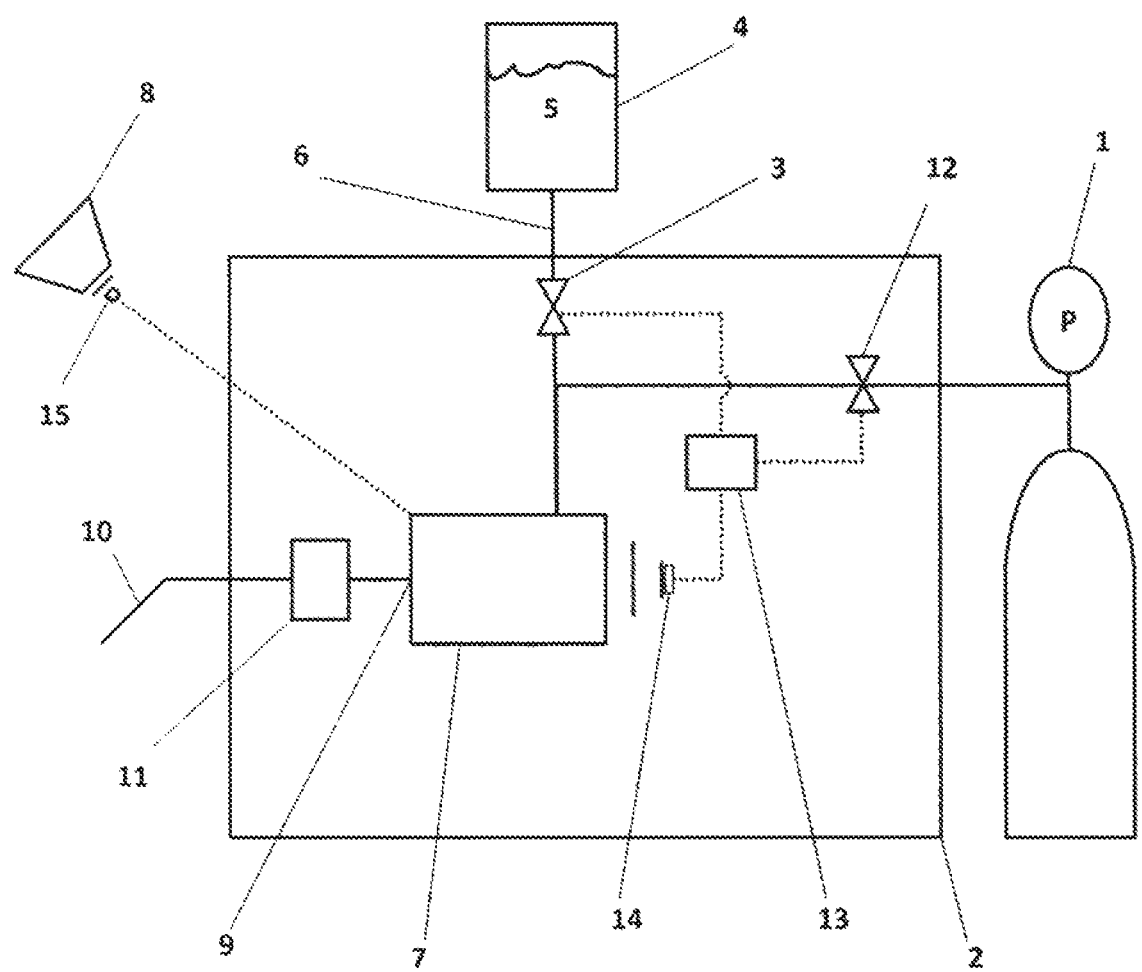

METHOD OF DISPENSING A BEVERAGE WITH VARIABLE PRESSURE

The present invention relates to a beverage dispensing device for dispensing different types of beverages or beverage components, wherein at least one of the beverage ingredients is provided in a unit dose as a pod or capsule.

More in particular, the present invention relates to such a beverage dispensing device, wherein at least one of said beverages or beverage components is a malt based beverage or a malt based beverage component.

At present there is a trend to fancier kinds of beverages, wherein multiple beverage components or beverages are added to one another so to provide a consumer with a sensation adapted to his taste.

A goal of this invention is to provide a beverage dispensing device allowing consumers to prepare and serve such fancier beverages at home with one device with a small countertop footprint.

According to the state of the art all kinds of beverage dispensing devices exist which allow for the dispensing of different types of beverages or beverage components, such as beverage dispensing devices for dispensing different types of coffees and teas possibly mixed with milk, cream or sugar and so on.

Usually, the coffee or tea is made by passing hot water through coffee powder or tea leaves respectively.

Other beverage dispensing devices are for example intended for dispensing all kinds of juices or sodas.

It is clear that such beverage dispensing devices are of a complete other category than the type of beverage dispensing devices of interest in the present invention.

Indeed, the dispensing of different types of beverages or beverage components wherein at least one of the one of said beverages or beverage components is a malt based beverage, a malt based beverage component, a cider or cider based component requires adapted equipment which is capable of coping with the specific needs related to malt based beverages or beverage components.

For example when dispensing a malt based beverage or beverage component, it is important to control foaming of the concerned beverage or beverage component.

Also, in beverage dispensing device having supply lines through which malt based beverages or malt based beverages are passed, a biofilm is slowly formed into the supply lines.

This biofilm reduces the quality for as far as the taste and smell is concerned of the dispensed malt based beverages or beverage components through the supply lines and must therefore be very regularly removed by a thorough cleaning of the supply lines.

Furthermore, the rate of dispensing, the pressures involved during dispensing and the volumes of liquid dispensed in beverage dispensing devices wherein at least one of the beverages or beverage components is a malt based beverage or a malt based beverage component are usually much higher than in the typical coffee machines or the like and require adapted equipment with increased capacity and strength.

Apart from the above differences it is to be understood that some ingredients are easy to concentrate and can be concentrated with a high concentration factor without impact on the quality, other ingredients however are far more difficult to concentrate without use of quality.

As a result, some ingredients can be loaded in a pod in very low levels (highly concentrated), whilst others can be loaded in a pod in only slightly concentrated form, resulting in a relative large volume.

The volume ratio between cooled base liquid and ingredients originating from the pods or capsules is a critical factor for the temperature at which the final beverage can be dispensed, and unlike coffee or tea which are dispensed hot or unlike soft drinks having a high sugar content, a base liquid of a malt based beverage has a freezing temperature of approximately 0° C., while the ideal dispensing temperature is between 2 and 5° C. Hence the temperature with which the base liquid may warm during the mixing and dispensing of the beverage is very small and to amount of concentrated ingredient added to the base liquid should be as small as possible not to jeopardize dispensing a final beverage at a desired temperature.

It is therefore an objective of this invention to overcome one or more of the above-mentioned drawbacks or possibly other non-mentioned drawbacks of the known beverage dispensing devices.

The present invention addresses the above and other drawbacks and concerns a method of preparing and dispensing a beverage with a dispensing device, the device comprising:

a housing comprising a beverage unit with a liquid line having a liquid inlet at one end and a beverage outlet at an opposite end; a pressure controller controlling the pressure in the liquid line; and an ingredient container receiving means such that when correctly installed, the content of the ingredient container is in fluid communication with the liquid line for mixing the content of the ingredient container with a base liquid in the liquid line;

an ingredient container identification unit;

a processor coupled to the identification unit and to the pressure controller for controlling said pressure controller in function of the container identification; the method comprising the steps of:

providing an ingredient container in the device;

identifying the ingredient container;

providing a base liquid;

mixing the content of the container with the base liquid to prepare the beverage to be dispensed;

dispensing the thus prepared beverage;

characterized in that the pressure in the liquid line changes from a first pressure level higher than ambient pressure level to a second pressure level higher than the ambient level by said pressure controller during mixing and dispensing of the beverage, the first pressure level being different than the second pressure level.

Preferably the pressure is maintained substantially constant at the first level during a fraction of the period needed for dispensing the beverage, and wherein the pressure is maintained substantially constant at the first level during a fraction of the period needed for dispensing.

More preferably the second pressure level is higher than the first pressure level, thus allowing flushing the liquid line at the end of the dispensing cycle, thereby cleaning the liquid line and preventing microbiological growth in the liquid line.

Another advantage of increasing the pressure in the liquid line towards the end of the dispensing cycle it the ability to stimulate foam creation which is beneficial when dispensing a beer or beer like beverage.

As such the method allows dispensing is a fermented beverage such as beer or cider having a gas pressure of at least 1.5 bar at a temperature of 2° C. with a foam collar.

With the intention of better showing the characteristics of the invention, hereafter, as example without any limitative character, some embodiments of a beverage dispensing device according to the invention are described, with reference to the accompanying drawings, wherein:

FIG. 1 is a schematic illustration of a first embodiment of a beverage dispensing device in accordance with the present invention;

The beverage dispenser 1 according to the invention, illustrated in FIG. 1, is a beverage dispenser of the type addressed as a home appliance, which is typically designed for home use to dispense one beverage per dispense cycle and which is configured as a table top appliance meaning it has a restricted height of about maximum 50 cm and a real footprint of about maximum 2500 $cm^2$.

The beverage dispenser comprises a housing 2 comprising a base liquid inlet 3 which is connected to a source 4 of a first base liquid source 5.

The dispenser beverage inlet 3 can for example be a pipe fitting which is suitable for connecting a source 4 to the beverage dispenser 1 or it can just be the inlet of a pipe or flexible tube used for flow of the base liquid 5 away from the source 4.

The base liquid 5 can be any product that could be used for composing a beverage, such as for example water, a malt-based beverage, a fermented beverage, beer, a cider based beverage or cider, a juice, a soft drink, milk, cream, coffee, tea or mixtures thereof, the base liquid source can either be non-carbonated or carbonated.

Depending on the type of the base liquid 5, the source 4 from which the base liquid 5 is supplied and in which the base liquid 5 is contained, can be for example a container, a plastic bag, a bottle, a keg or cask and so on.

The source 4 can be a pressurized vessel, containing a pressurized gas for driving the base liquid 5 out of the vessel.

In other cases the source 4 can comprise pumping means or separate gas bottles for that purpose.

It is clear that all kinds of other commonly used elements, such as valves, switches, detectors, electronic or not electronic controller equipment in general are not represented in the drawings.

The source 4 is in this case connected to the inlet 3 by means of a liquid line 6, formed for example by a flexible or rigid tube or pipe 6.

Turning now to the housing of the dispensing device, the base liquid inlet is coupled to a liquid line extending from the base liquid inlet to a beverage outlet through which a final beverage is to be dispensed.

The housing further comprises at least one container receiving means 7 for receiving an ingredient container 8 such as a pod or capsule comprising a unit dose of a beverage ingredient. The receiving means comprising an ingredient discharge 9 through which the unit dose contained in the pod or capsule can be discharged in the fluid line upon dispensing.

The ingredient containers comprise exactly one unit dose of beverage ingredient and are therefore suited for preparing exactly one beverage allowing maximal flexibility to customize a beverage to be dispensed. The containers are preferably of the kind generally addressed as pods or capsules and will be referred to as such in the description below.

The pods or capsules preferably comprise a solid or liquid ingredient, varying from hop concentrates, fruit concentrates, sweeteners, bittering additives, concentrated spices, foaming promoters, concentrated malt-based liquids, concentrated fermented liquids, concentrated beer, colorants and or mixtures thereof.

In this case the liquid line comprises two sections, a first extending from the base liquid inlet to a liquid inlet of the receiving means for guiding base liquid into the pod or capsule such as to discharge the unit dose beverage ingredient through the beverage discharge into the second section of the liquid line extending from the ingredient discharge at the receiving means to a beverage outlet 10.

At a location downstream the ingredient discharge, a mixing chamber 11 is provided in the liquid line, which mixing chamber comprises a wall defining a chamber having a liquid inlet and a liquid outlet, both controlled by a valve.

According to the invention, the device comprises a pressure regulator for controlling the pressure in the liquid line. Such pressure regulator 12 can be provided at the source 4 or can be provided separately in the device. The pressure regulator should be controllable by means of a control unit 13 preferably an electronic unit comprising a microprocessor housed in the dispensing device.

The device further comprises a pod or capsule comprising identification means 14 such as for example a bar-code scanner or RFID scanner that allows identifying content related identity tags on the pods or capsules such as a bar code or RFID tag 15.

In this case the pressure regulator control unit also comprises a memory comprising a set of pre-loaded dispensing pressure level sequences for setting and varying the pressure in the liquid line during a dispensing cycle, whereby the microprocessor selects a sequence based on input received from the pod or capsule identification means and controls the pressure regulator accordingly.

In order to allow a good control it is further preferred that the control unit comprises a flow meter allowing determining the volume of liquid flowing through the liquid line as an input to the microprocessor.

The source of pressurized gas can either be a metal high pressure cartridge comprising liquid food grade $CO_2$, $N_2$ or $N_2O$ readily available on the market or can be a plastic cartridge comprising food grade $CO_2$, $N_2$ or $N_2O$ at lower pressures of between 4 and 2 bar.

The above described device allows dispensing a beverage whereby the pressure in the liquid line changes from a first pressure level higher than ambient pressure to a second pressure level higher than the ambient level by said pressure controller during mixing and dispensing of the beverage.

As such it for example possible to load the device with a pod or capsule containing a concentrated beer and coupling the device with a source of carbonated water.

The device identifies the pod and thereby the content thereof and a pre-set pressure sequence for dispensing beer is loaded from the memory.

Upon dispensing, the pressure regulator will be controlled to set the pressure in the liquid line at a pressure corresponding to the gas pressure desired in the beer upon dispensing (eg. 2.2 bar). This pressure is maintained substantially constant during the dispensing of approximately 90% of the volume of the beer to be dispensed. Subsequently the pressure regulator is actuated to increase pressure to a level of eg. 2.4 bar in the liquid line, to promote foaming of the beer at dispensing and as such obtain a foam collar on the dispensed beer. This pressure in the liquid line is maintained substantially constant until all liquid for the beer is dispensed.

After the required volume of liquid is dispensed, the pressure regulator can be actuated to further increase the pressure to a level of eg. 3 bar to clean the liquid line and blow out any remaining liquid rests, thereby preventing liquid remaining in the liquid line which would increase the chance of the formation of a biofilm in the liquid line.

The invention claimed is:

1. A method of preparing and dispensing a beverage with a countertop dispensing device, the device comprising:
   a housing comprising a beverage unit with a liquid line having a liquid inlet at one end and a beverage outlet at an opposite end; a pressure controller controlling the pressure in the liquid line; and a container receiving means, to receive an ingredient container, such that when correctly installed, the content of the container is in fluid communication with the liquid line for mixing the content of the ingredient container with a base liquid in the liquid line;
   an ingredient container identification unit;
   a processor coupled to the identification unit and to the pressure controller for controlling said pressure controller based on input received from the container identification;
   the method comprising the steps of:
   providing the ingredient container in the device;
   identifying the ingredient container;
   providing a base liquid;
   mixing the content of the ingredient container with the base liquid to prepare the beverage to be dispensed;
   the thus prepared beverage;
   wherein the pressure in the liquid line changes from a first pressure level higher than ambient pressure level, to a second pressure level higher than the ambient level, and higher than the first pressure level, by said pressure controller during dispensing of the beverage, the first pressure level being different from the second pressure level, wherein the pressure is maintained substantially constant at the first level during a first fraction of the period needed for dispensing the beverage, and wherein the pressure is maintained substantially constant at the second level during a second fraction of the period needed for dispensing.

2. The method according to claim 1, wherein the beverage dispensed is a fermented beverage having a gas pressure of at least 1.5 bar at a temperature of 2° C.

3. The method according to claim 2, wherein the beverage is a malt based beverage or apple juice based beverage.

* * * * *

UNITED STATES PATENT AND TRADEMARK OFFICE
CERTIFICATE OF CORRECTION

PATENT NO. : 10,597,278 B2
APPLICATION NO. : 15/514484
DATED : March 24, 2020
INVENTOR(S) : Pellaud Page 1 of 1

It is certified that error appears in the above-identified patent and that said Letters Patent is hereby corrected as shown below:

In the Claims

Column 6 at Line 5 Claim 1 should read:
-- dispensing the thus prepared beverage; --

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*